United States Patent
Lo et al.

(10) Patent No.: US 8,781,731 B2
(45) Date of Patent: Jul. 15, 2014

(54) ADJUSTING METHOD AND SYSTEM OF INTELLIGENT VEHICLE IMAGING DEVICE

(75) Inventors: Sheng-Chieh Lo, Taichung (TW); Chia-Tseng Chen, Taichung (TW); Chih-Yuan Wang, Taichung (TW)

(73) Assignee: Autorad Tech Co., Ltd, Taichung (TW)

( * ) Notice: Subject to any disclaimer, the term of this patent is extended or adjusted under 35 U.S.C. 154(b) by 264 days.

(21) Appl. No.: 13/426,614

(22) Filed: Mar. 22, 2012

(65) Prior Publication Data

US 2013/0054086 A1 Feb. 28, 2013

(30) Foreign Application Priority Data

Aug. 31, 2011 (TW) .............................. 100131365 A

(51) Int. Cl.
*G06F 7/00* (2006.01)
*B60R 1/00* (2006.01)

(52) U.S. Cl.
CPC .............. *B60R 1/00* (2013.01); *B60R 2300/607* (2013.01); *B60R 2300/804* (2013.01); *B60R 2300/802* (2013.01); *B60R 2300/70* (2013.01); *B60R 2300/402* (2013.01)
USPC ............................ 701/439; 701/458; 382/104

(58) Field of Classification Search
CPC ................... B60R 2300/101; B60R 2300/303; B60R 2300/306; B60R 2300/602; B60R 2300/607; B60R 2300/802
USPC .................... 701/36, 431, 439, 458; 348/148; 382/104; 340/932.2

See application file for complete search history.

(56) References Cited

U.S. PATENT DOCUMENTS

| | | | |
|---|---|---|---|
| 6,917,693 B1* | 7/2005 | Kiridena et al. | 382/104 |
| 2010/0321211 A1* | 12/2010 | Ko et al. | 340/932.2 |
| 2011/0103650 A1* | 5/2011 | Cheng et al. | 382/104 |
| 2011/0156887 A1* | 6/2011 | Shen et al. | 340/425.5 |

* cited by examiner

*Primary Examiner* — Thomas Tarcza
*Assistant Examiner* — Kevin Myhre
(74) *Attorney, Agent, or Firm* — CKC & Partners Co., Ltd.

(57) ABSTRACT

An adjusting method and an adjusting system of an intelligent vehicle imaging device are provided, wherein a real feature point for comparison is disposed in a monitoring area around a vehicle. A camera captures images around the vehicle. The images are transmitted to the controller and displayed on a touch display panel. The controller performs image processing on the images and the real feature point, and compares the real feature point with position data of predetermined feature points, and generates a bird's-eye view image. If the images are captured, the bird's-eye view image is rotated and scaled after conversion according to a predetermined position and a predetermined proportion and then is located on a stitched image and outputted. A blind spot area size or a lane departure parameter is selected through the touch display panel, and the stitched image is adjusted through the touch display panel.

8 Claims, 14 Drawing Sheets

ADJUSTING METHOD AND SYSTEM OF INTELLIGENT VEHICLE IMAGING DEVICE

RELATED APPLICATIONS

The application claims priority to Taiwan Application Serial Number 100131365, filed Aug. 31, 2011, which is herein incorporated by reference.

BACKGROUND

1. Technical Field

The present invention relates to an adjusting method and an adjusting system of an intelligent vehicle imaging device. More particularly, the present disclosure relates to an adjusting method and a system of an intelligent vehicle imaging device by using a touch display panel. The present invention sends warning messages regarding blind spot area detection and lane departure detection to a driver according to different driving statuses.

2. Description of Related Art

On the design concepts, modern vehicles not only are used as means of transportation but also pursues driving comfort, operability and safety, such as an electronic Anti-lock Brake System (ABS), airbags, a vehicle imaging system, etc., which are all used for providing an improved driving environment for drivers and passengers.

A conventional vehicle imaging system which is combined and works with cameras disposed around a vehicle to issue rear and side states to a driver provides considerable assistance for vehicle turning, lane changing and reversing movements. However, internal parameters of the conventional cameras used for the vehicle imaging system have been set before shipping, and a common driver cannot adjust the vehicle imaging system according to personal habits or road conditions. In other words, different cameras installed for vehicle imaging system give different view results based on the lenses and sensors used, which is difficult to fit each driver's need. For example, if junks are stacked in a corner of a garage, but a driver cannot adjust the manufactured internal parameters of the cameras to see the corner for avoiding hitting the junks. For another example, each driver has different recognitions about a lane width and a blind spot area.

Therefore, the vehicle imaging system with one identical camera specification will be impractical and inconvenient when it is applied to different users.

SUMMARY

According to one embodiment of the present invention, an adjusting method of intelligent vehicle imaging device is provided. In this invention, at least one real feature point used for comparison is disposed in a monitoring area around a vehicle. One or more images are captured by single or plural cameras around a vehicle. The image is transmitted to the controller and displayed on a touch display panel. The controller performs image processing including un-distortion calibration, homograph transformation, and image stitching. In order to perform homograph transformation, a plurality of predetermined feature points near the vehicle are compared with these feature points in the captured image to generate a bird's-eye view image. If multiple images around the vehicle are captured, the bird's-eye view images are rotated and scaled after conversion according to a predetermined position and a predetermined proportion and then are located on a stitched image and outputted to the touch display panel. Through bird's-eye images provided by cameras around the vehicle, users can modify blind spot area sizes or lane departure parameters on the touch display panel.

According to another embodiment of the present invention, an adjusting system of intelligent imaging device includes at least one camera, a controller and a touch display panel. The camera used to capture at least one image around a vehicle. The controller is connected to the camera for receiving the image to output a bird's-eye view image. The touch display panel is connected to the controller which outputs and displays a stitched image on the touch display panel by comparing a plurality of predetermined feature points with the image, and setting an area of a blind spot detection or a lane departure parameter of the image via the touch display panel.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
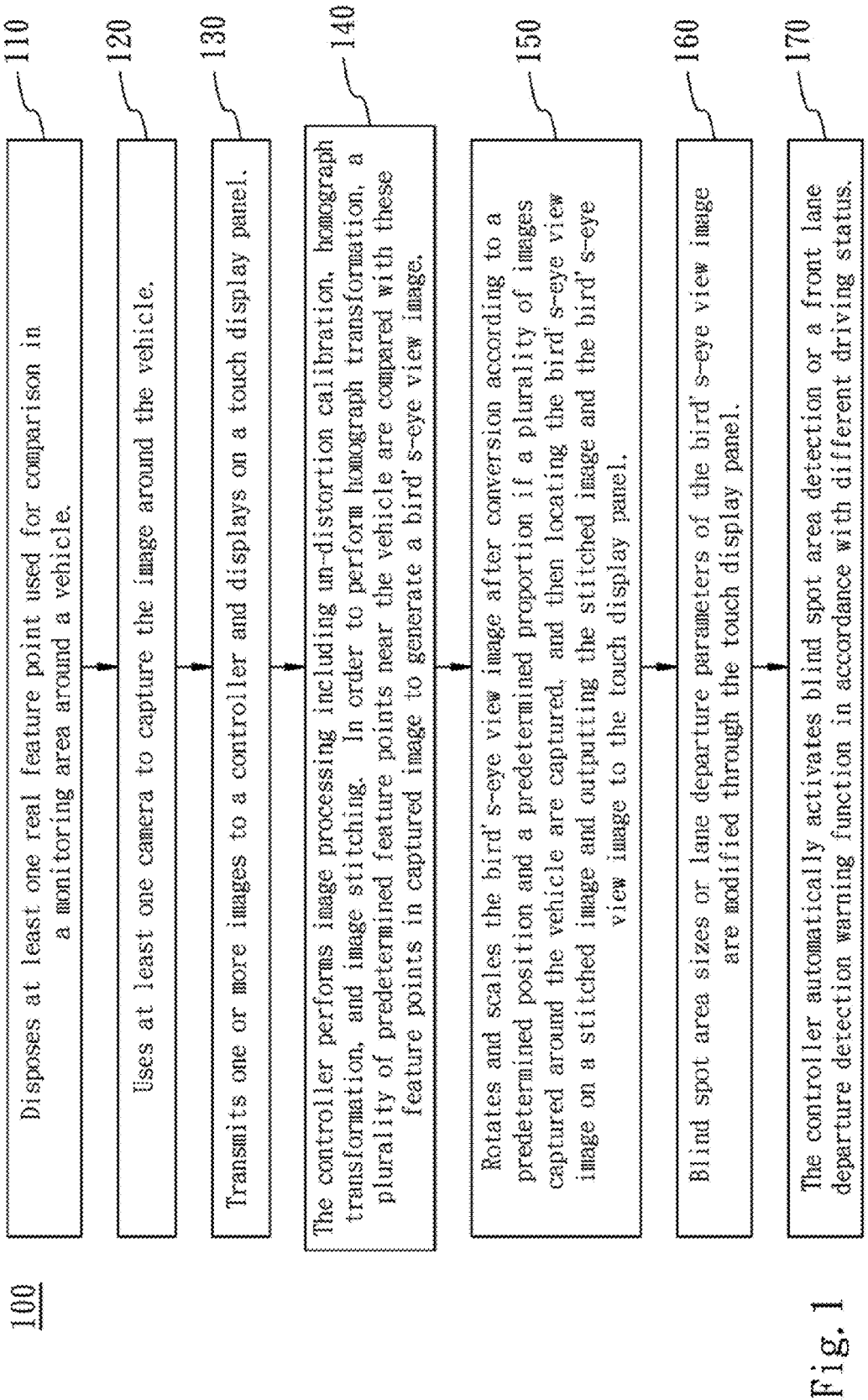
FIG. 1 is a flow chart showing an adjusting method of an intelligent vehicle imaging device of present invention.

FIG. 1 is a flow chart showing an adjustment method of an intelligent vehicle imaging system according to an embodiment of the present invention. As shown in FIG. 1, an adjustment method of intelligent vehicle imaging system includes following steps. Step 110 is performed for disposing at least one real feature point used for comparison in a monitoring area around a vehicle. Step 120 is performed for using at least one camera to capture the image around the vehicle. Step 130 is performed for transmitting one or more images to a controller and displays on a touch display panel. In Step 140, the controller performs image processing includes un-distortion calibration, homograph transformation, and image stitching. In order to perform homograph transformation, a plurality of predetermined feature points near the vehicle are compared with these feature points in the captured image to generate a bird's-eye view image. Step 150 is performed for rotating and scaling the bird's-eye view image after conversion according to a predetermined position and a predetermined proportion if a plurality of images captured around the vehicle are captured, and then locating the bird's-eye view image on a stitched image and outputting the stitched image and the bird's-eye view image to the touch display panel. In Step 160, blind spot area sizes or lane departure parameters of the bird's-eye view image are modified through the touch display panel. In Step 170, the controller automatically activates blind spot area detection or a front lane departure detection warning function in accordance with different driving status. The following will make further description on adjustments for image conversion, detection algorithm and parameters.

Figure 2:
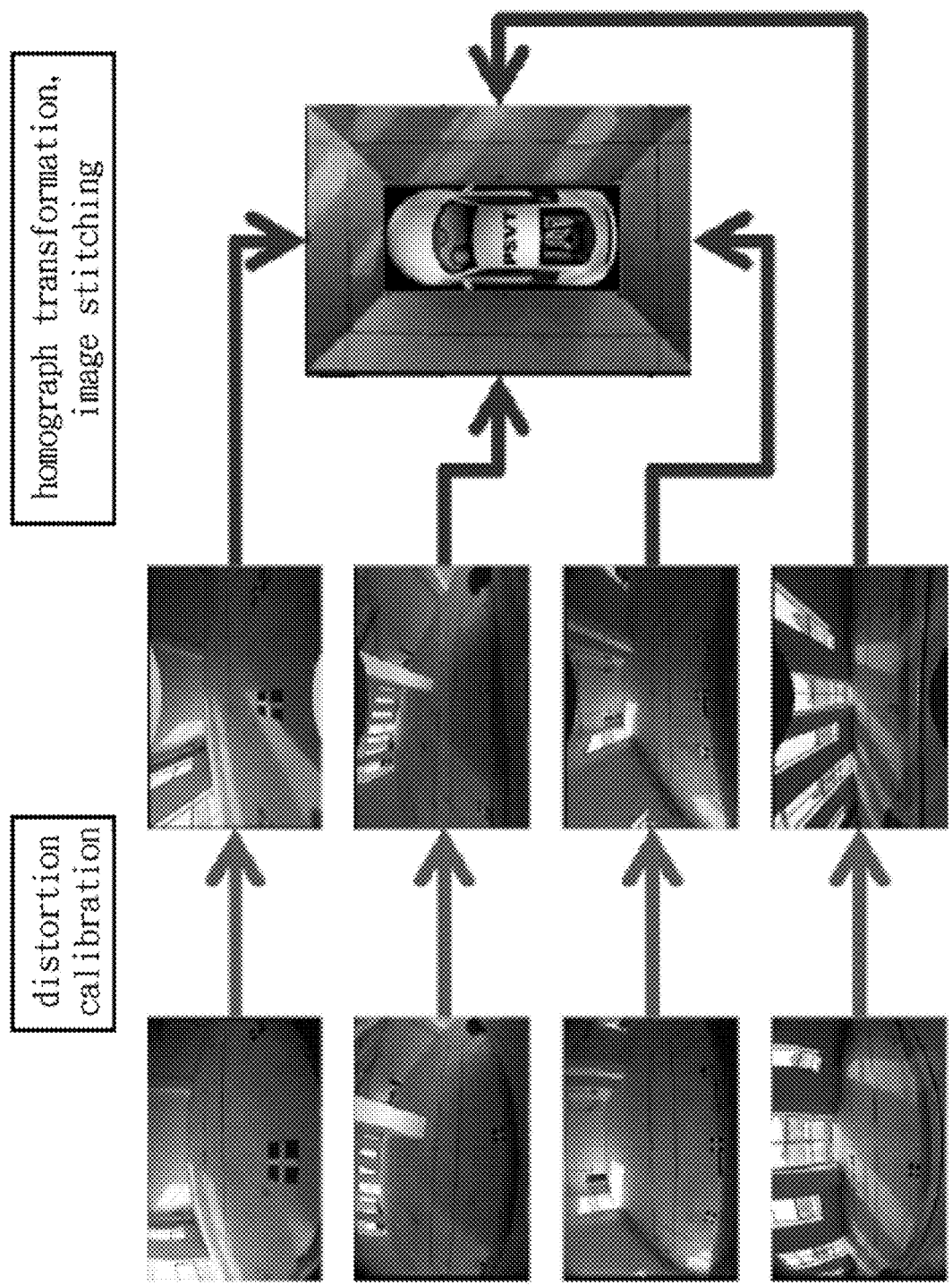
FIG. 2 is a photograph showing a bird's-eye view image conversion of present embodiment.

FIG. 2 is a photograph showing a bird's-eye view image conversion of present embodiment. As shown in FIG. 2, image conversion algorithm performs distortion calibration, homograph transformation and image stitching on captured images to provide the immediate bird's-eye around view image to the driver.

When the vehicle is moving forward slowly, the controller automatically enables a front blind spot detection function which detects a moving object in the front blind spot area and activates an alarm when dangers are sensed. Additionally, when the vehicle signal light is turned on, the controller is automatically switched to side blind spot detection function which detects objects approaching from rear side of the vehicle and issues an alert. Under the circumstance of high-speed straight driving, the controller will automatically enable a lane departure warning function which detects whether the vehicle is running in the middle of the lane. If the vehicle shifts off the lane due to an involuntary reason such as the driver's distraction or fatigue, the controller will activate the alarm.

When the vehicle is moving backwards, the controller will automatically enable a rear image detection function which activates the alarm when the distance between detected objects and the vehicle is less than a defined distance.

The system parameters adjustment by using the touch display panel means that the user can select and drag the feature points on a captured image of the touch display panel, and the setting of the feature points can be finished quickly without needing to have an extra device but the touch display panel, thus promoting the intuition and the convenience of using the parameters adjustment.

First, the bird's-eye view image conversion and the setting of correct parameters will be described in the below. The bird's-eye view image conversion includes lens distortion calibration, homograph transformation and image stitching. Lens distortion calibration is merely related to optical properties of a lens, such that the same parameters can be applied to each of the cameras of the same type without correcting the parameters for each of the cameras. However, parameters of homograph transformation are different in accordance with camera positions and view angles. In the present embodiment, the user can select and adjust the feature points for the bird's-eye view image conversion via the touch display panel.

Figure 3:
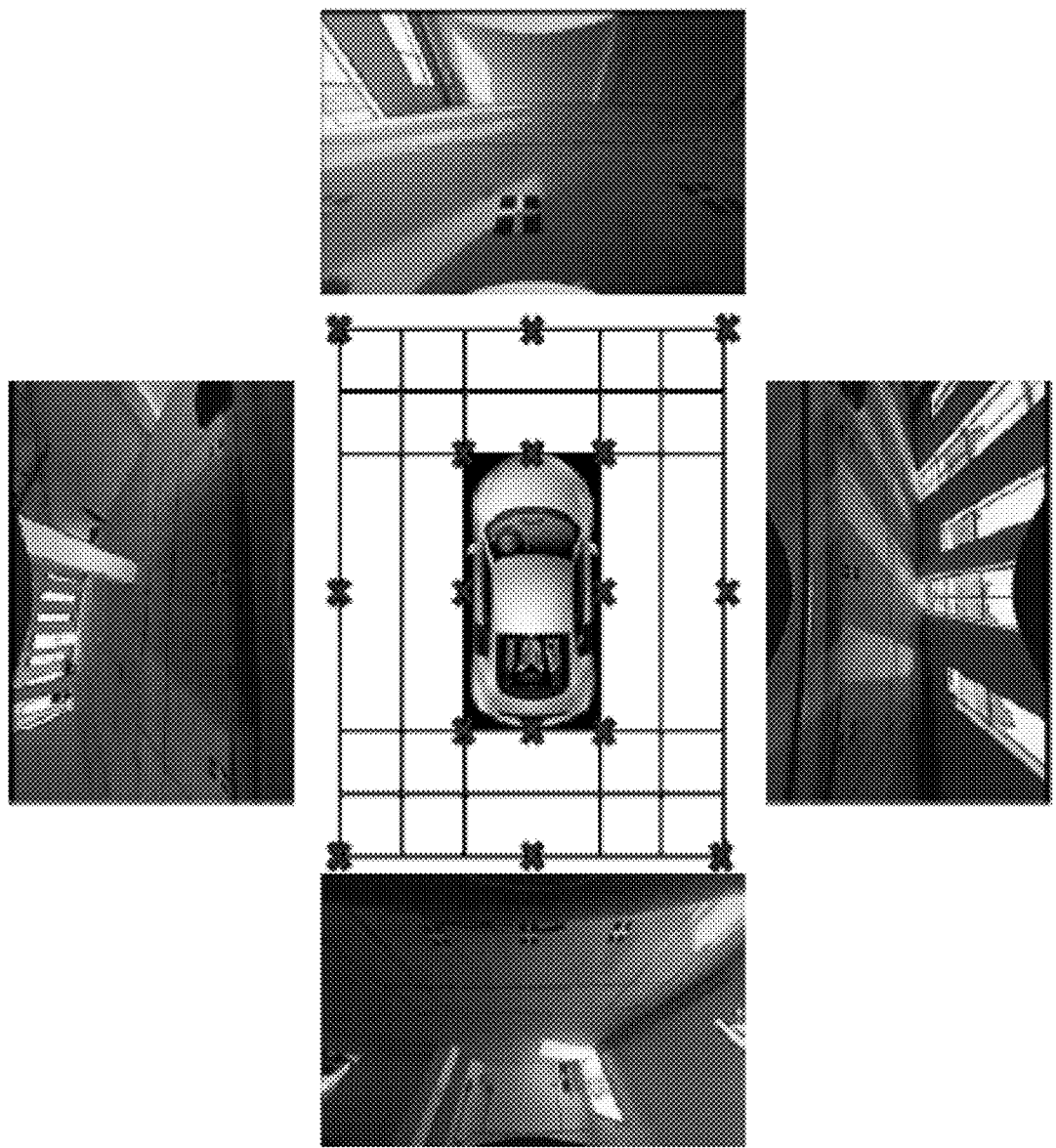
FIG. 3 is a photograph showing feature points arrangement of present embodiment.

FIG. 3 is a photograph showing arrangement of feature points for bird's-eye view image adjustment of present embodiment. As shown in FIG. 3, to arrange the site for bird's-eye view image adjustment, the user draws frames extending 1 meter and 2 meters from the vehicle, and then puts the real feature points on the Xs which are marked in the image. In other words, the Xs are located on apexes of the frame and a midpoint of each side of the frame. Thereafter that, the user selects the feature points which Care processed by distortion calibration of each of the cameras around the vehicle, and finishes the homograph transformation of the bird's-eye view image.

In order to simplify the steps of converting the bird's-eye view image into the around view image, the present embodiment combines steps of image stitching with homograph transformation. By mapping the feature points in the captured image to the positions of feature points in predetermined world coordinates, time needed for converting the bird's-eye view image can be reduced, and the steps for generating the around view image can be simplified as well.

In the below, parameter setting for the blind spot area detection is introduced. The blind spot area varies according to different vehicle types and models, camera positions, cameras lens specifications and drivers' visual conditions. The present design allows the user to adjust the blind spot detection area directly on the touch display panel depending on personal visual condition and preference. Specifically, on the touch display panel, the user selects the desired cameras to change or adjust the detection area for each camera. The detection area is shown in a rectangle shape on the touch display panel; the user can adjust and change the upper and lower boundaries of the rectangle to a preferred detection area. In addition, the users can easily set the detection sensitivity on the touch display panel for better individual needs.

Figure 4:
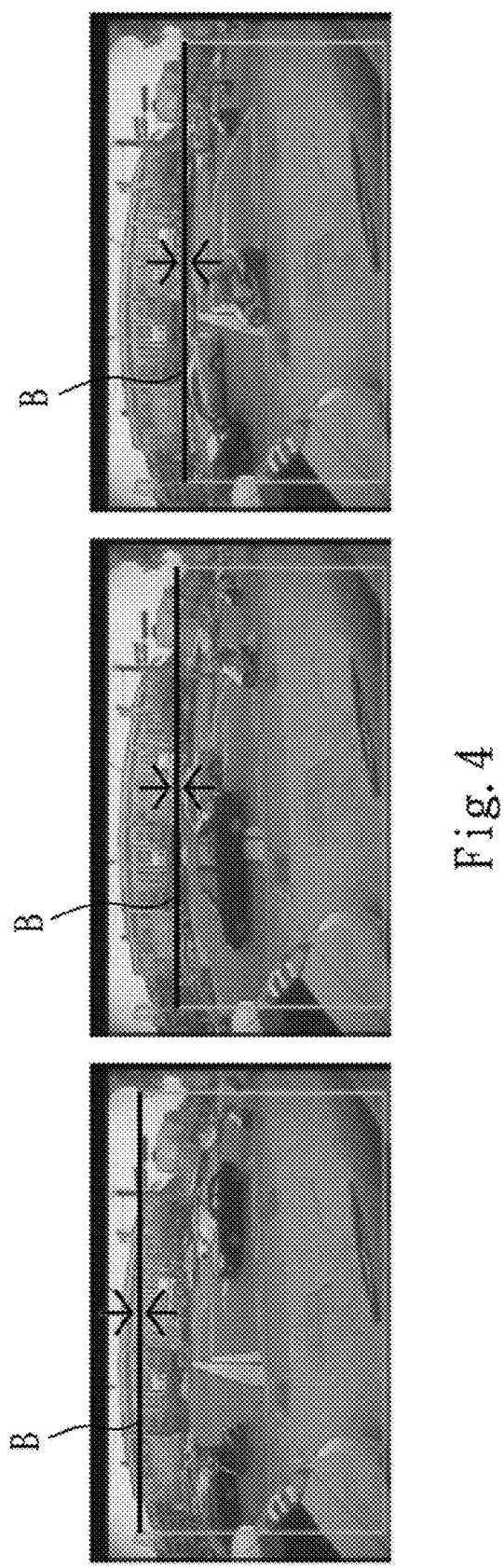
FIG. 4 is a photograph showing a blind spot detection area adjustment of present embodiment.

FIG. 4 is a photograph showing a blind spot detection area adjustment of present embodiment. As shown in FIG. 4, if a driver desires to change the detection area in boundary B, after boundary B on touch display panel has been pressed for two seconds, the color of boundary B is changed and two arrows are shown and pointed to the boundary line which can be adjusted as shown In FIG. 4. The user may adjust the boundary B size as desired by sliding the boundary line on the touch display panel.

Figure 5:
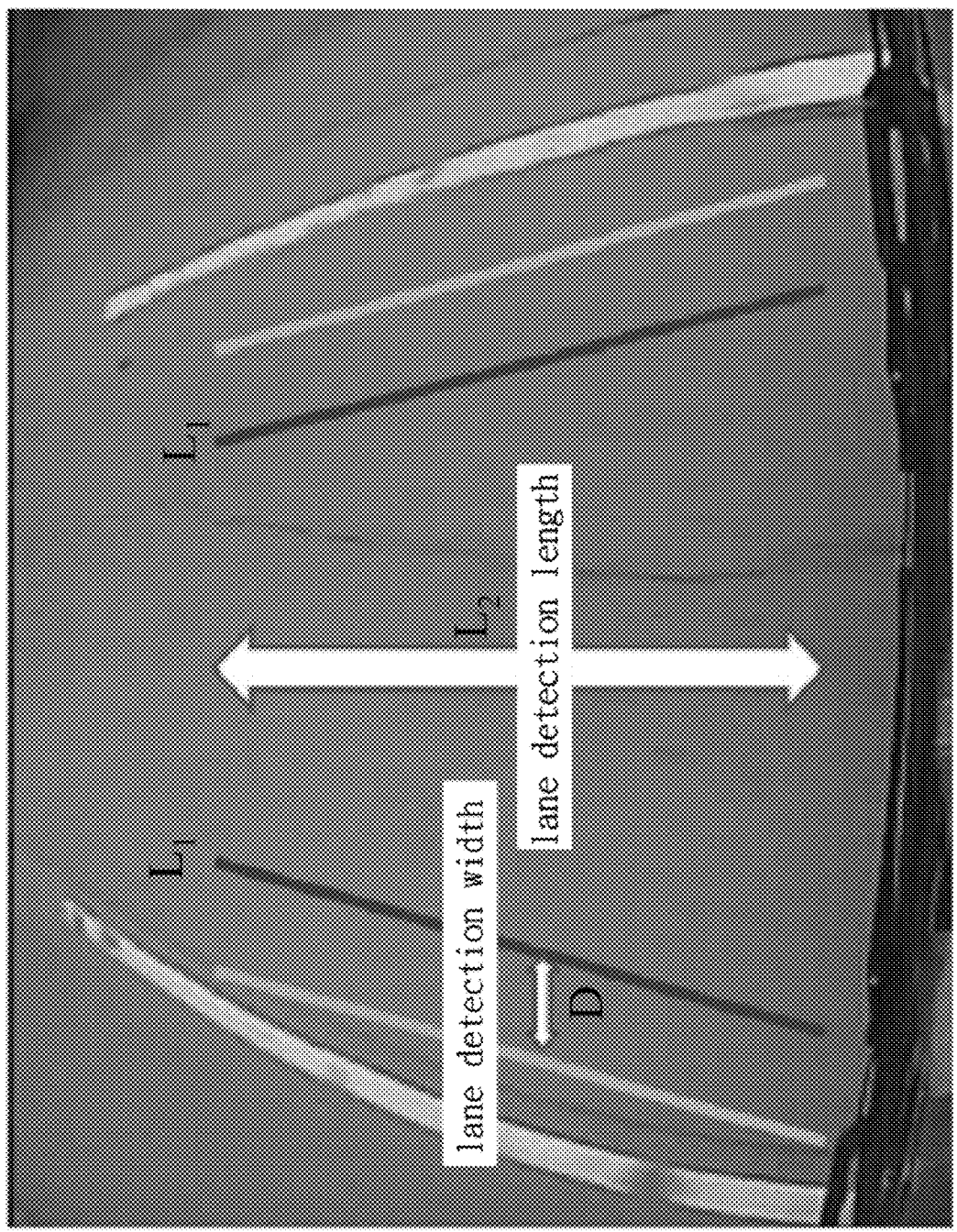
FIG. 5 is a photograph showing parameters setting for lane departure warning of the present embodiment.

Furthermore, please refer to FIG. 5 for parameters setting of lane departure warning of the present embodiment. As shown in FIG. 5, the lane departure warning parameters include a front extension line $L_1$, a lane detection width D and a lane detection length $L_2$. The data regarding L1, D, and L2 vary with different vehicle types and models, camera positions, and lens specifications, and thus, In order to improve the practicability and convenience, the present embodiment allows the user to set and adjust the lane departure warning parameters via the touch display panel directly.

Figure 6:
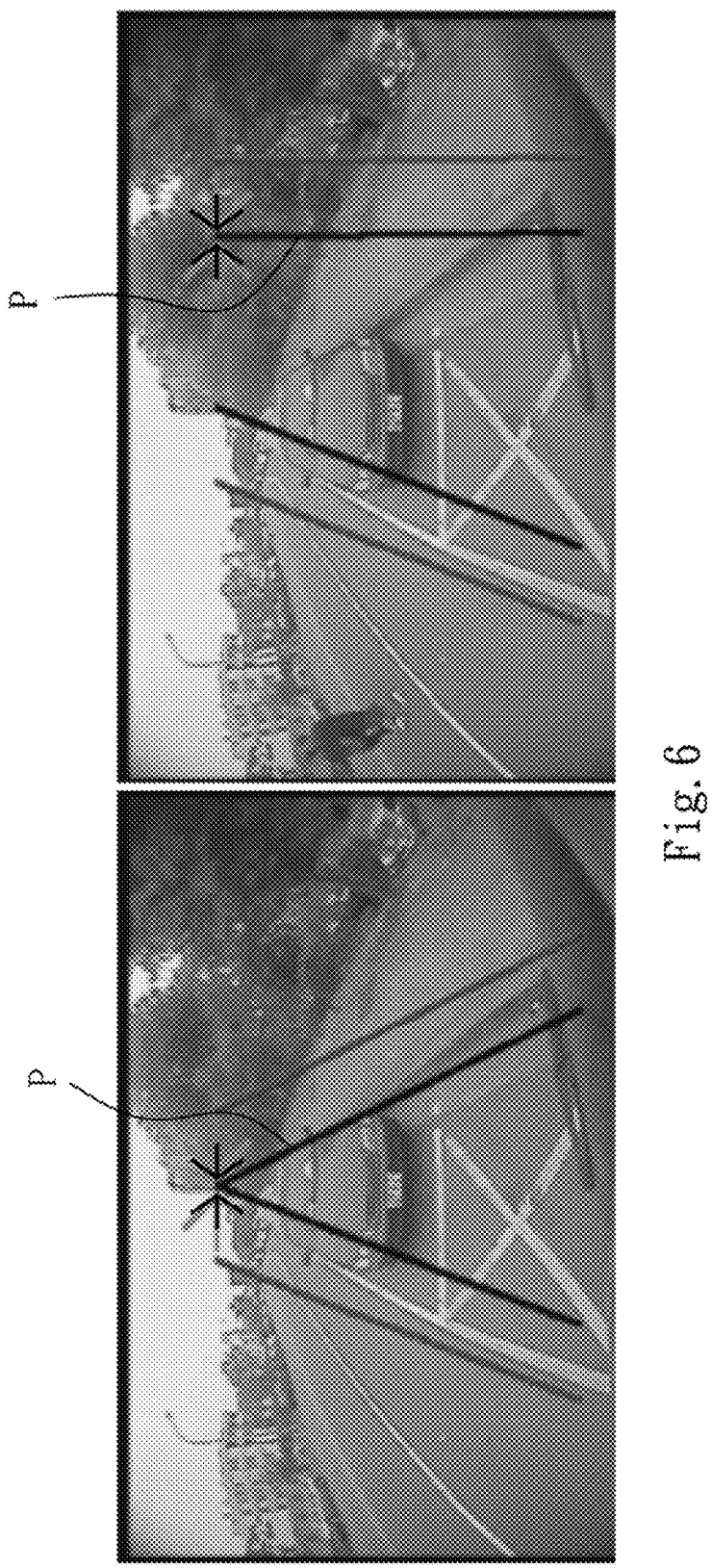
FIG. 6 is a photograph showing a lane departure warning parameter adjustment of present embodiment.

FIG. 6 is a photograph showing a lane departure warning parameter adjustment of the present embodiment. The lane departure warning parameters can be easily changed and set on the touch display panel by any driver or user. As shown in FIG. 6, in the parameter setup mode, a parameter P desired to be adjusted is long pressed for two seconds, and then adjusting arrows appear to indicate the parameter P desired to be adjusted, and then the purpose of the changing the position of the parameter P can be achieved as long as the user slides the parameter P to a desired position.

Finally, similar to the blind spot area detection, a rear collision warning function detects warning areas according to vehicle types/models, cameras positions, and lens specifications as well. The present embodiment also provides a touch control function to adjust the detection area for the rear collision warning function. The driver may easily adjust the rear collision detection area simply by following the instructions shown in the touch display panel.

Figure 7:
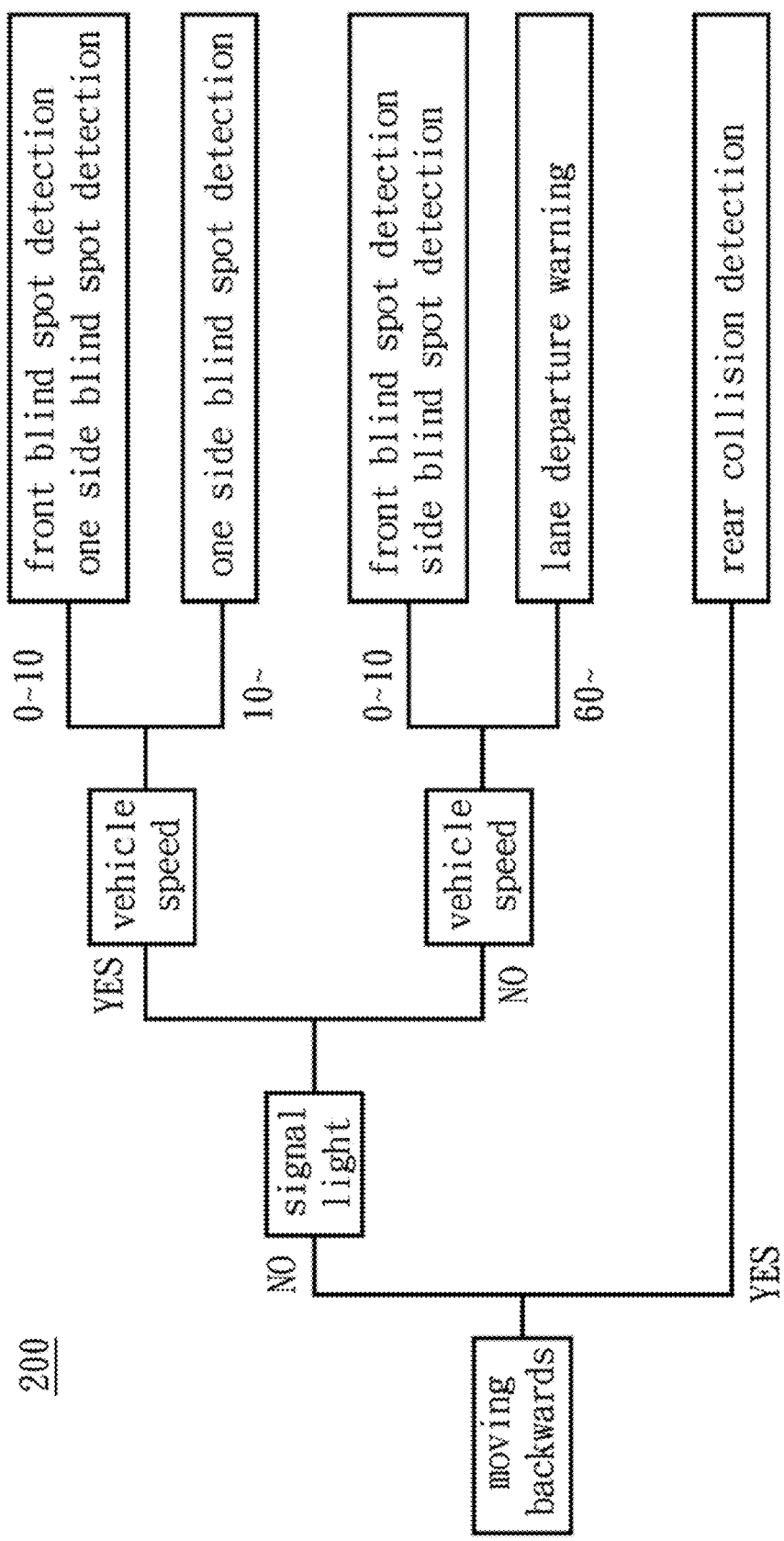
FIG. 7 is a flow chart showing the detection mode determination of the intelligent vehicle imaging system.

The following description is about the steps of determining detection and a display mode. The controller is able to capture and analyze different vehicle signals to obtain present status and motion of the vehicle, according to which to determine the imaging system's function. FIG. 7 is a flow chart showing detection mode determination for the intelligent vehicle imaging system. As shown in FIG. 7, the steps of detection mode determination 200 are illustrated. When the controller analysis vehicle signal used to recognize the movement of a vehicle when reverse gear signal is on, the controller directly enables the rear image detection function. Instead, if the controller obtains a signal from signal light, regardless of the vehicle speed, either left or right side blind spot detection function will be enabled according to which signal light is switched on. Meanwhile, if the vehicle speed is less than 10 km/hr, the front blind spot detection function will be enabled as well.

In case neither signals from reverse gear nor signal lights are found, meaning that the vehicle is moving forwards, if the speed is less than 10 km/hr, in the controller will enable the front blind spot detection algorithm and the side blind spot detection algorithm at the same time. If the speed is higher than 60 km/hr, the controller will enable the lane departure warning function only.

Figure 8:
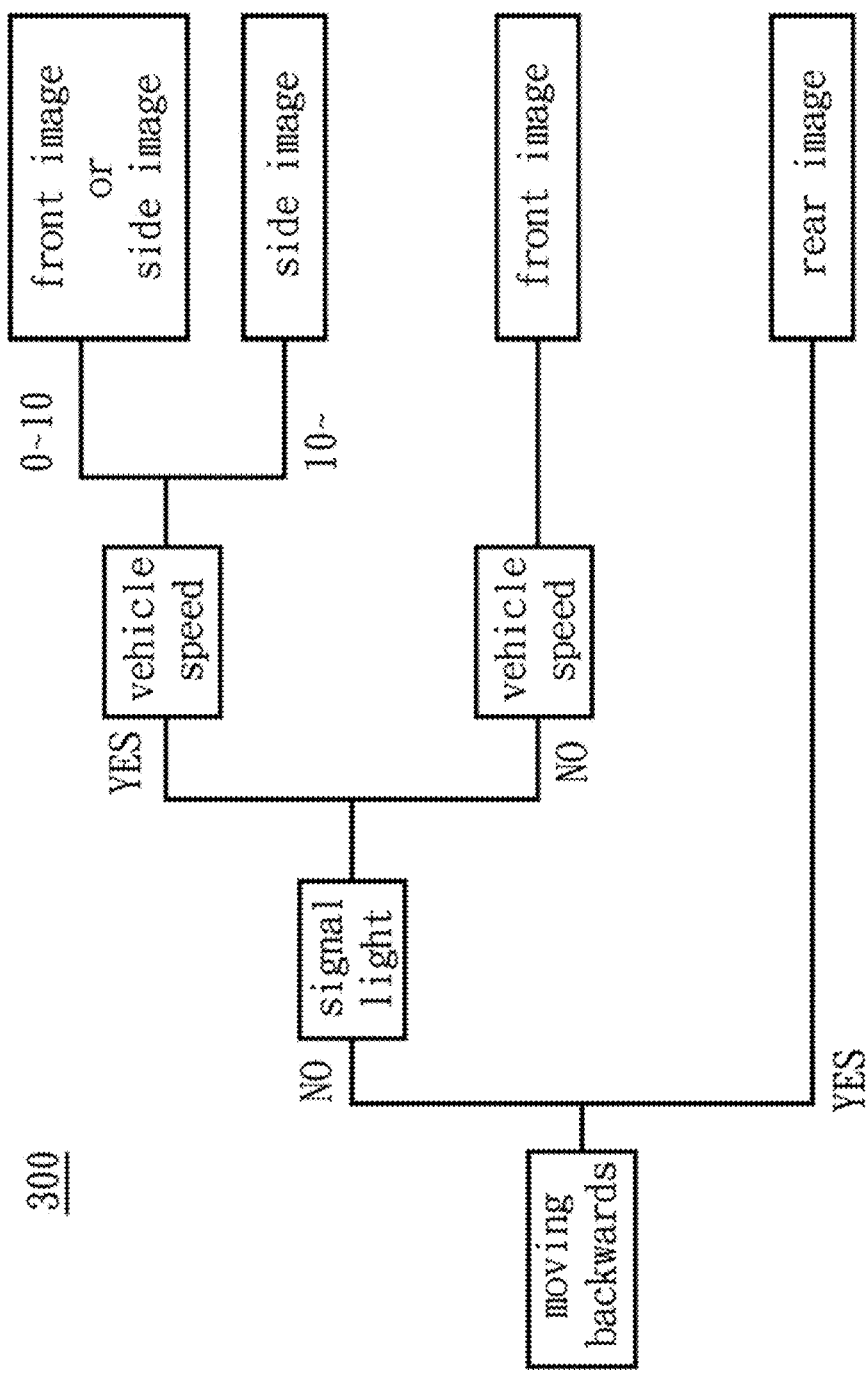
FIG. 8 is a flow chart showing the display mode determination of intelligent vehicle imaging system.

FIG. 8 is a flow chart showing the display mode determination of the intelligent vehicle imaging system. As shown in FIG. 8, after the computation of the detection algorithm is completed, the controller obtains signals of the present warning status. The controller combines a warning signal, a vehicle signal and a touch signal to determine which image model should be displayed on the touch display panel according to the steps of determining a display mode 300.

Figure 9:
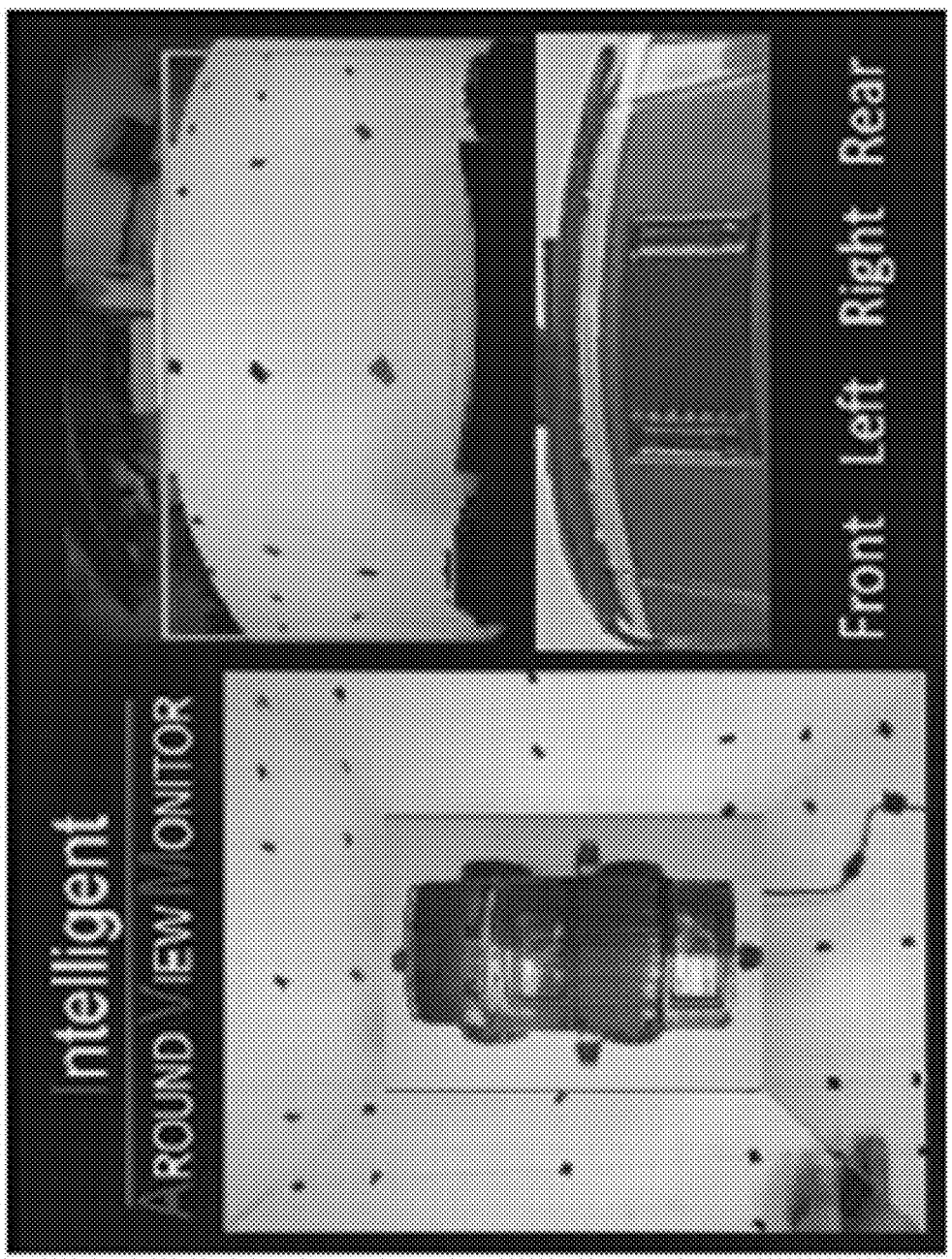
FIG. 9 is a picture showing the coexistence of a rear image and a bird's-eye view image of present embodiment.
Figure 10:
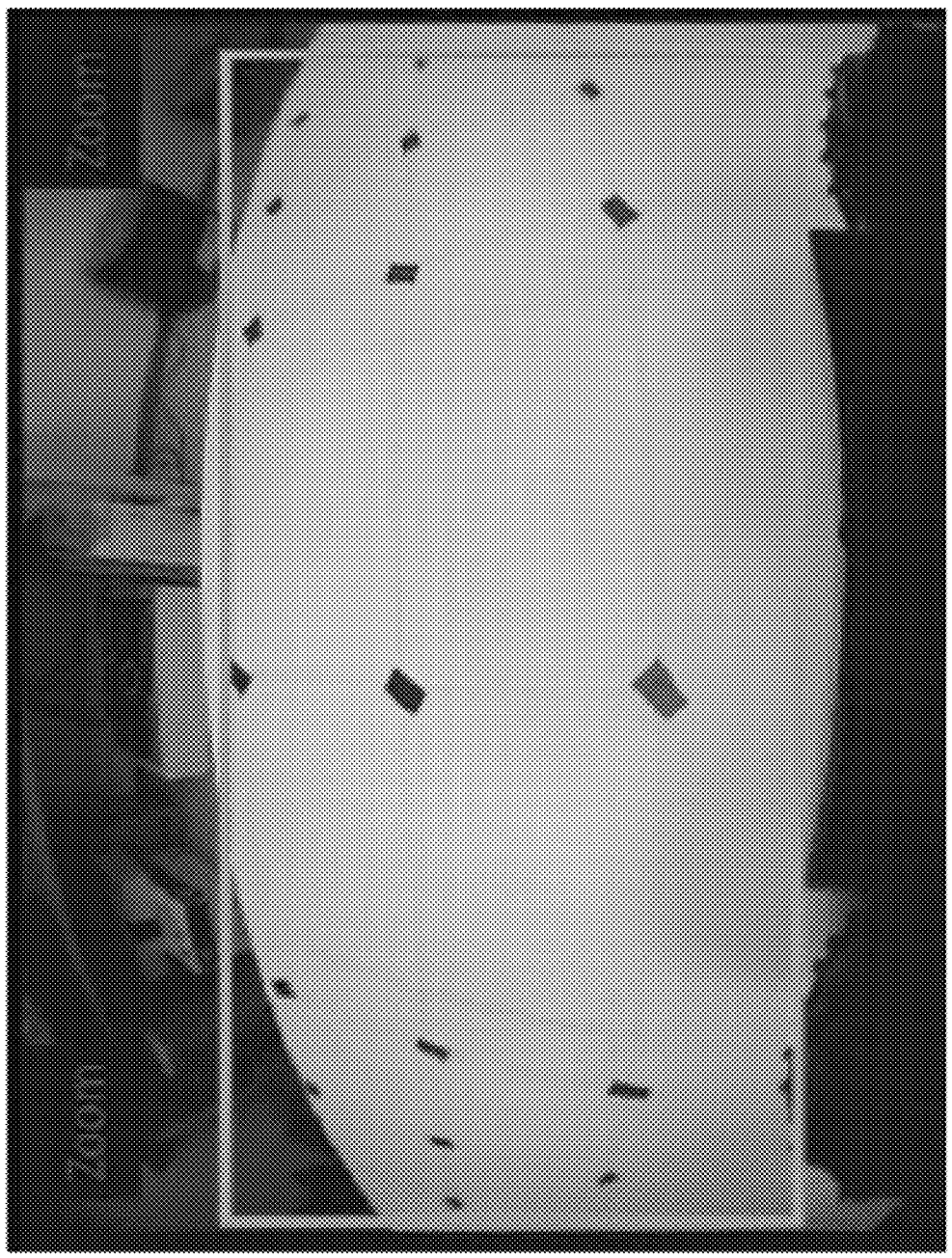
FIG. 10 is an original rear image of present embodiment.

When the vehicle is moving backwards, the touch display panel is enforced to display the rear image. FIG. 9 is a picture in picture photograph image showing the coexistence of a rear image and a bird's-eye view image of the present embodiment. FIG. 10 is an original rear photograph image of the present embodiment. As shown in FIG. 9 and FIG. 10, the driver can choose the original rear image or the picture in picture image on which the rear image and the bird's-eye view image coexists. In the picture in picture image, the driver only needs to touch the original camera image on the right side of the touch display panel to enlarge the image which is being watched. If the user wants to return to the picture in picture image, he just needs to touch the touch display panel again.

When there is no reverse gear signal found and none of the signal light is turned on, the vehicle is considered as moving forwards, and the default screen of the touch display panel is the picture in picture image on which the front image and the bird's-eye view image coexists. If there is no warning signal, the user only needs to touch the direction texts on the right bottom of the picture in picture image on the touch display panel to choose any camera image according to personal preferences. Therefore, the present embodiment has much freedom of usage.

When the vehicle has the signal light on but is not moving backward, the default screen of the touch display panel is the picture in picture image of the camera on the single side of which the signal light is turned on. When the speed of the vehicle is less than 10 km/hr and the front blind spot detection function well be turned ON; the touch display panel will be enforced to display the front image to warn the driver if there is a collision object likely to appear in the front blind spot area.

Figure 11:
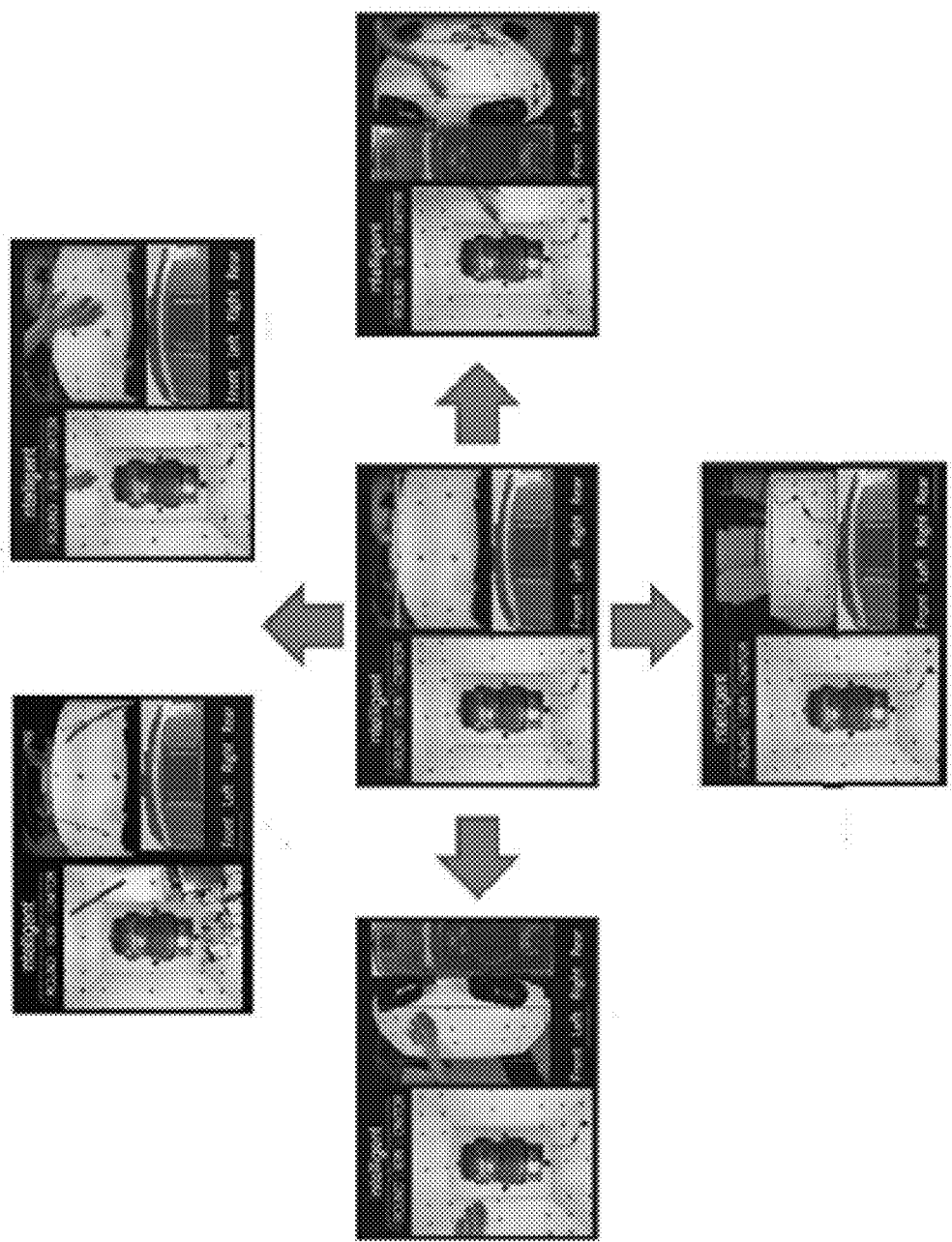
FIG. 11 is a photograph showing the switching of a picture in picture mode of the present embodiment.

If there is special event such as moving backwards, turning on the signal light, having warning states and so on, the touch display panel will be enforced to display the camera that triggers the special event. FIG. 11 is a photograph showing the switching of a picture in picture mode of present embodiment. As shown in FIG. 11, when there is a moving object in the front blind spot area of the vehicle, the touch display panel will be enforced to display the picture in picture image of the front camera and the color of the detection area pointing frame on the screen will change from green to red to warn the user. When there is a moving object approaching from the backside into the side blind spot detection area of the vehicle, the touch display panel will be enforced to display the picture in picture image of the side camera and the frame color of the detection area on the screen will change from green to red. When there is a collision object likely to appear in the rear detection area, the touch display panel will be enforced to display the picture in picture image of the rear camera and the frame color of the detection area on the screen will change from green to red as well.

The present embodiment uses multi-channel video inputs and the image detection warning electronic controller as the hardware computing core which can capture the video from cameras set around the vehicle and perform detection and determine a display mode simultaneously by analyzing the present vehicle signals. Meanwhile, the user can easily adjust and set the parameters and switch the cameras or change the image models via the touch display panel, which promotes the freedom of the usage of the intelligent vehicle imaging system.

In the aspect of the software, base on the bird's-eye view image, the user can observe whether there is dangerous obstacle around the vehicle at any time. With the front and side blind spot detection algorithms, the controller will enable the alert sound or light for warning if there is any moving object approaching the vehicle and likely causing danger, which greatly promotes the driving safety for the driver. Furthermore, under the circumstance of high-speed driving, as of LDW function, the controller will also enable the alert sound to warn the user in order to reduce the possibility of accidents if the driver departs from a lane due to distraction and exhaustion.

Figure 12:
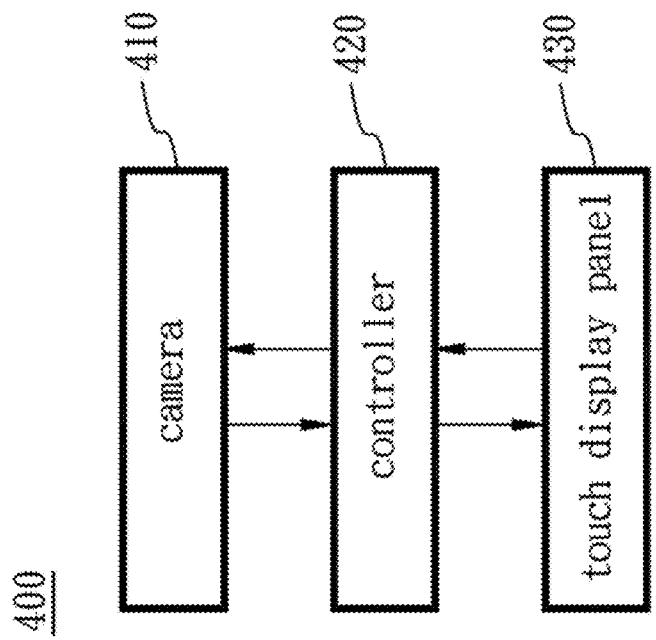
FIG. 12 is a schematic block diagram of an intelligent vehicle imaging system according to another embodiment of the present invention.
Figure 13:
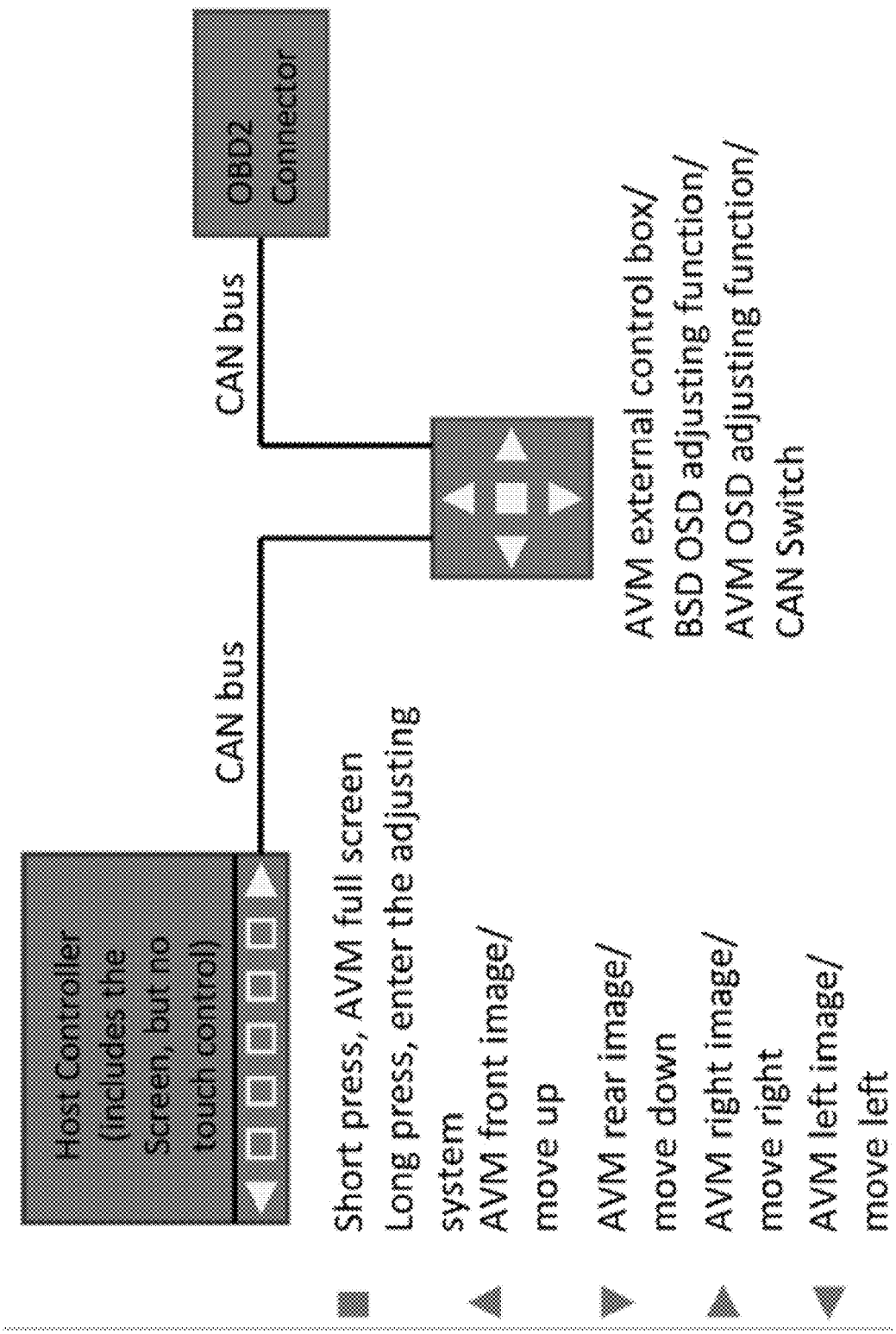
FIG. 13 is a schematic diagram showing adjustment by using an external control box or pressing monitor buttons of the present embodiment.
Figure 14:
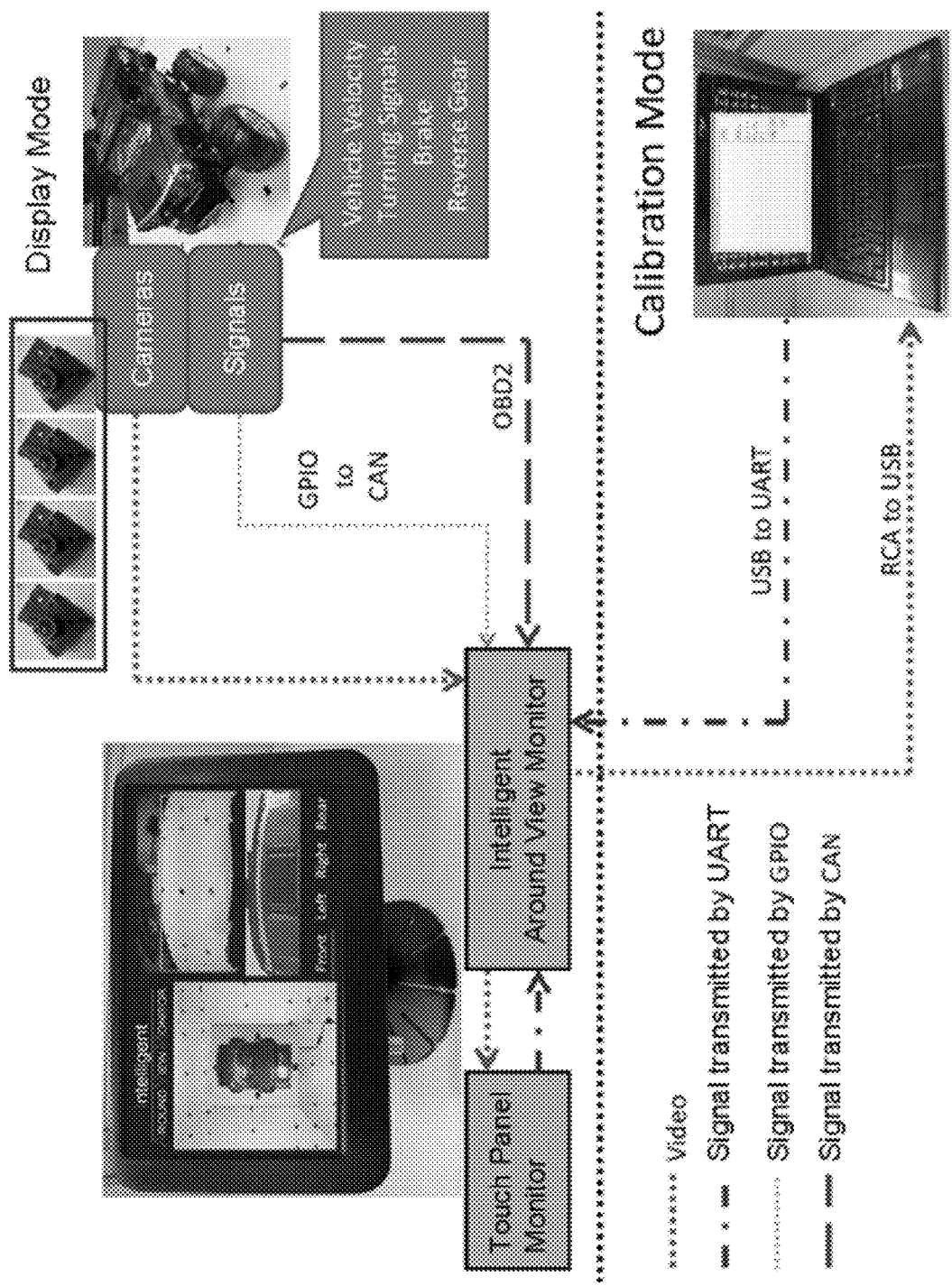
FIG. 14 is a schematic diagram showing adjustment by connecting a computer device according to present embodiment.

FIG. 12 is a schematic block diagram of the intelligent vehicle imaging system according to another embodiment of the present invention. FIG. 13 is a schematic diagram showing adjustment by using an external control box or pressing monitor buttons of the present embodiment. FIG. 14 is a schematic diagram showing adjustment by connecting a computer to present embodiment. As shown in FIG. 12 to FIG. 14, the adjusting system of an intelligent vehicle imaging device 400 includes at least one camera 410, a controller 420 and a touch display panel 430.

The camera 410 is used to capture the image around a vehicle. After receiving signals from the camera, the controller 420 transforms captured images into bird's-eye view images, compares a plurality of predetermined feature points with the image, creates stitched images to be displayed on the touch display panel 430, and parameter setting for blind spot area detection or lane departure warning is also performed via the touch display panel. The application methods and procedures of each of the elements have been described in detail in the aforementioned embodiments.

The present embodiment not only provides the user with arbitrarily adjusting directions, angles or internal parameters of the cameras 410, but also displays the adjusted results immediately. Thus, the user can know better about the surrounding environment of the vehicle to promote the practicability and the convenience of the intelligent vehicle imaging system.

According to the aforementioned embodiments, using the adjusting method and system of the intelligent vehicle imaging system, the driver not only can arbitrarily adjust directions, angles or internal parameters for cameras via the touch display panel, but also can watch the adjusted results immediately. Therefore, the driver can know better about the surrounding environment of the vehicle also promote the practicability and the convenience of the intelligent vehicle imaging system, to insure the driving safety to the driver.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An adjusting method of an intelligent vehicle imaging device, the adjusting method comprising:
    disposing at least one real feature point used for comparison in a monitoring area around a vehicle;
    capturing at least one image around the vehicle by using at least one camera;
    transmitting the image to a controller and displaying the image on a touch display panel;
    predetermining a frame and a plurality of feature points for an actual space corresponding to the image by using the controller, using the controller to perform image processing and computation after the frame and the feature points are selected via the touch display panel, and then comparing the real feature point with position data of a plurality of predetermined feature points, thereby generating a bird's-eye view image;
    rotating and scaling the bird's-eye view image after conversion according to a predetermined display position, a predetermined screen display size and a predetermined proportion by using the controller if a plurality of images around the vehicle are captured, and then locating and stitching the bird's-eye view image on a stitched image and outputting the stitched image and the bird's-eye view image to the touch display panel; and
    selecting a blind spot area size or a lane departure parameter of the bird's-eye view image through the touch display panel, and adjusting the stitched image synchronously through the touch display panel.

2. The adjusting method of claim 1, further comprising:
    automatically activating a blind spot area detection warning function or a front lane departure detection warning function of different areas according to different driving statuses by using the controller.

3. The adjusting method of claim 1, wherein the frame is a rectangular frame.

4. The adjusting method of claim 1, wherein the predetermined feature points are located on apexes of the frame and a midpoint of each side of the frame.

5. An adjusting system of intelligent imaging device that implements the adjusting method of claim 1, comprising:
    at least one camera used to capture at least one image around a vehicle;
    a controller connected to the camera for receiving the image; and
    a touch display panel connected to the controller;
    wherein a frame and a plurality of feature points for an actual space corresponding to the image are predetermined by the controller, an image processing and a computation are performed by the controller after the frame and the feature points are selected via the touch display panel, and then the real feature point is compared with position data of a plurality of predetermined feature points, thereby generating a bird's-eye view image;
    wherein the bird's-eye image is rotated and scaled by the controller, the controller outputs and displays a stitched image and the bird's-eye image on the touch display panel by comparing a plurality of predetermined feature points with the image, and an area of a blind spot detection or a lane departure parameter of the image are set via the touch display panel.

6. The adjusting system of claim 5, wherein the controller comprises a screen and a plurality of control buttons, and the control buttons are used to switch the camera, and adjust a bird's-eye view image conversion, a stitched image display, an area of a blind spot detection and a lane departure parameter.

7. The adjusting system of claim 5, wherein the controller is connected to an external control box for switching images between the camera, and adjusting a bird's-eye view image conversion, a stitched image display, an area of a blind spot detection, and a lane departure parameter.

8. The adjusting system of claim 5, wherein the controller is connected to a computer for switching the camera, and adjusting a bird's eye view image conversion, a stitched image display, an area of blind spot detection and a lane departure parameter.

* * * * *